United States Patent [19]

Choung et al.

[11] Patent Number: 5,856,404
[45] Date of Patent: Jan. 5, 1999

[54] BACK BEDDING SEALANT COMPOSITION

[75] Inventors: Hun R. Choung, Colleyville; Edward T. Clutter, Keller, both of Tex.; Aureliano Perez, Farmington Hills, Mich.

[73] Assignee: Schnee-Morehead, Inc., Irving, Tex.

[21] Appl. No.: 411,869

[22] Filed: Mar. 28, 1995

Related U.S. Application Data

[63] Continuation of Ser. No. 193,580, Feb. 8, 1994, abandoned.

[51] Int. Cl.$^6$ .............................. C08L 33/08; C08L 30/02; C08L 75/04
[52] U.S. Cl. .................. 525/127; 428/423.1; 428/425.6; 428/424.6; 428/425.8; 428/518; 525/451
[58] Field of Search .................................. 525/127, 451; 428/423.1, 425.6, 424.6, 425.8, 518

[56] References Cited

U.S. PATENT DOCUMENTS

| | | | |
|---|---|---|---|
| Re. 34,093 | 10/1992 | Powell et al. .............................. | 524/228 |
| 3,772,237 | 11/1973 | Bullman et al. ................... | 260/31.8 M |
| 3,862,074 | 1/1975 | Hickey .............................. | 260/29.6 NR |
| 4,079,028 | 3/1978 | Emmons et al. ......................... | 524/804 |
| 4,119,602 | 10/1978 | Isgur et al. ........................ | 260/296 NR |
| 4,456,718 | 6/1984 | Brinkmann et al. ..................... | 524/114 |
| 4,626,567 | 12/1986 | Chang ...................................... | 524/493 |
| 4,927,876 | 5/1990 | Coogan et al. .......................... | 524/457 |
| 4,948,829 | 8/1990 | Mitsuji et al. ........................... | 524/457 |
| 4,954,559 | 9/1990 | Hartog et al. ........................... | 524/507 |
| 4,978,708 | 12/1990 | Fowler et al. ........................... | 524/507 |
| 5,006,413 | 4/1991 | Hartog et al. ........................... | 428/463 |
| 5,109,057 | 4/1992 | Tsuno et al. ............................ | 524/588 |
| 5,124,384 | 6/1992 | Goldstein ................................ | 524/169 |
| 5,157,069 | 10/1992 | Campbell ................................ | 524/500 |
| 5,204,404 | 4/1993 | Werner, Jr. et al. .................... | 524/501 |
| 5,221,581 | 6/1993 | Palmer et al. ........................ | 428/425.8 |
| 5,238,987 | 8/1993 | Bodwell et al. ......................... | 524/376 |

OTHER PUBLICATIONS

*Waterborne Urethanes Improve Acrylics' Adhesive Performance*, Walker J. Warren, Adhesive Age, Jul. 1990.

*Primary Examiner*—W. Robinson H. Clark
*Attorney, Agent, or Firm*—Michael A. O'Neil

[57] ABSTRACT

A water borne back bedding sealant formulated from an acrylic polymer emulsion and a urethane polymer emulsion provides superior adhesion, tensile properties, low temperature flexibility, rheology and bond strength. In one embodiment of the present invention, the back bedding sealant comprises the following components: from 50% to 75% by weight of an acrylic polymer emulsion, from 7% to 25% by weight of a urethane polymer emulsion which is compatible with the acrylic polymer emulsion plus minor amounts of components to be selected from a list comprising: rheology modifiers, glycols, mineral oil, silanes, Ph adjusters, surfactants, water, silicas, and antimicrobial agents. These superior properties can be attained even with a clear sealant.

13 Claims, 1 Drawing Sheet

BACK BEDDING SEALANT COMPOSITION

This application is a continuation of application Ser. No. 08/193,580, filed on Feb. 8, 1994, now abandoned.

TECHNICAL FIELD

The present invention relates to improved sealants for use in commercial construction, and more particularly, to improved back bedding sealants in commercial window and door fabrication.

BACKGROUND OF THE INVENTION

In the fabrication of doors and windows (hereafter called units) back bedding sealants are used to seal and bond panes of glass to retain the pane in position within the frame, to provide a weather proof seal and, in some cases to reinforce the structural strength of the unit. In a typical application, the back bedding is applied to the glazing legs of the unit, the glass pane is "dropped" onto the sealant-bearing glazing legs and stops are installed against the glass face opposite the face in contact with the sealant. The sealant fills the gap between the glazing legs and the glass thus providing a seal against water and air infiltration. If the sealant has sufficient adhesive and bonding properties, it will also bond the glass to the unit. This bonding function will contribute significantly to the overall structural strength of the unit.

Structural strength is necessary in all windows and doors in order to keep them intact, leak free and to prevent permanent deformation when subjected to forces caused by wind pressure and opening and closing. When sash and frame components are of sufficient strength to resist such forces, the glass needs only to be sealed in the unit to prevent leakage. In some applications, however, windows and doors can be made with sash and frame components which are not of sufficient strength unless bonded to the glass. In these applications, bonding the glass to the frame components reinforces the frame components so that the overall structural strength of the unit is adequate for the particular application. The use of back bedding sealant compounds which will bond to glass has become prevalent because of lower component costs due to reduced material requirements.

Back bedding sealants which serve only to seal the glass are commonly referred to as ductile back bedding sealants. Those which also bond the glass and thereby affect the overall strength of the unit are referred to as bonding type back bedding sealants. The present invention relates to bonding type back bedding sealants.

Water based sealants have been used for back bedding for many years but their use was limited to less severe applications that did not require bonding of the glass for strength. Over the last several years, water based bonding type back bedding sealants have been introduced which add some strength to the unit. These sealants have generally, however, not had the combination of rheological, tensile, adhesive and low temperature properties required for many applications. For example, known pigmented water based sealants may provide low temperature flexibility and high temperature tensile strength. However, these sealants do not provide high levels of adhesion and thus do not fail cohesively in a peel test unless heated to 100° F. or higher for at least 24 hours prior to measuring the adhesion. If left to cure at temperatures below 100° F., even for several weeks, these sealants will not attain the desired strength or cohesive failure properties. This is a significant disadvantage since windows and doors frequently are not exposed to elevated temperature for many weeks or months after being placed in service. In the alternative, the unit can be placed in a curing chamber at elevated temperature to facilitate the development of adequate bond strength. This step entails extra time, expense and bother, making a bedding sealant that will develop adequate bond strength at low (less than 85° F.) temperature highly desirable.

The problem of obtaining the desired strength and cohesive failure properties at ambient curing temperatures has been a serious drawback to using water based back bedding sealants. Polymers and combinations of polymers have been used in the field of heat-activated adhesives but these formulations must be cured at temperatures ranging from 175°–275° F. before the desired bond strength and adhesion are developed. This makes the formulations unsuitable for use as back bedding sealants, as the units are typically allowed to cure at ambient temperature.

Other known clear water based sealants may have low temperature flexibility and cohesive failure in the peel test without heating. These sealants, while adequate, do not have the adhesive strength and tensile strength of the present invention, particularly at elevated temperatures.

Other water based sealants have rheologies which are suitable for joint sealing applications but not for back bedding. The use of these sealants in back bedding applications requires special care during the assembly process to avoid excessive squeeze out of the sealant when it is compressed between the glass and the frame.

Thus, there exists a need for an improved bonding type back bedding sealant with improved rheology and tensile properties which develops adequate adhesion and bond strength when the unit is cured at low (less than 85° F.) temperature.

SUMMARY OF THE INVENTION

The object of this invention is to provide a water based back bedding sealant with rheological properties, tensile properties, adhesion, low temperature flexibility and bond strength that are superior to those found in water based back bedding sealants presently available in the market. In addition, the back bedding sealant must develop these properties subject to curing at ambient temperature. Using a combination of an acrylic polymer emulsion, such as RHOPLEX 2620 (made by Rohm and Haas Co.) and a urethane-acrylic co-polymer hybrid emulsion, such as FLEXTHANE 620 (made by Air Products and Chemicals, Inc.) and formulated with additives such as surfactants, rheology modifiers, antimicrobials, PH adjusters, and antifreeze agents, the present invention yields a bedding sealant with the desired characteristics. The sealant can be used clear or with pigments and still maintain adhesive and tensile strength. Shim or spacer beads can be incorporated into the back bedding compound of the present invention.

BRIEF DESCRIPTION OF THE DRAWINGS

For a more complete understanding of the present invention and the advantages thereof, reference is now made to the following Detailed Description taken in conjunction with the accompanying Drawings in which.

DETAILED DESCRIPTION

The present invention relates to a water based bonding type back bedding sealant with unique properties and advances in performance over existing water based back bedding sealants. The sealants of the invention have a unique combination of rheological and tensile properties in addition to the ability to develop adhesion and bond strength at low (less than 85° F.) temperature that make them an advancement over the prior art.

Figure 1:
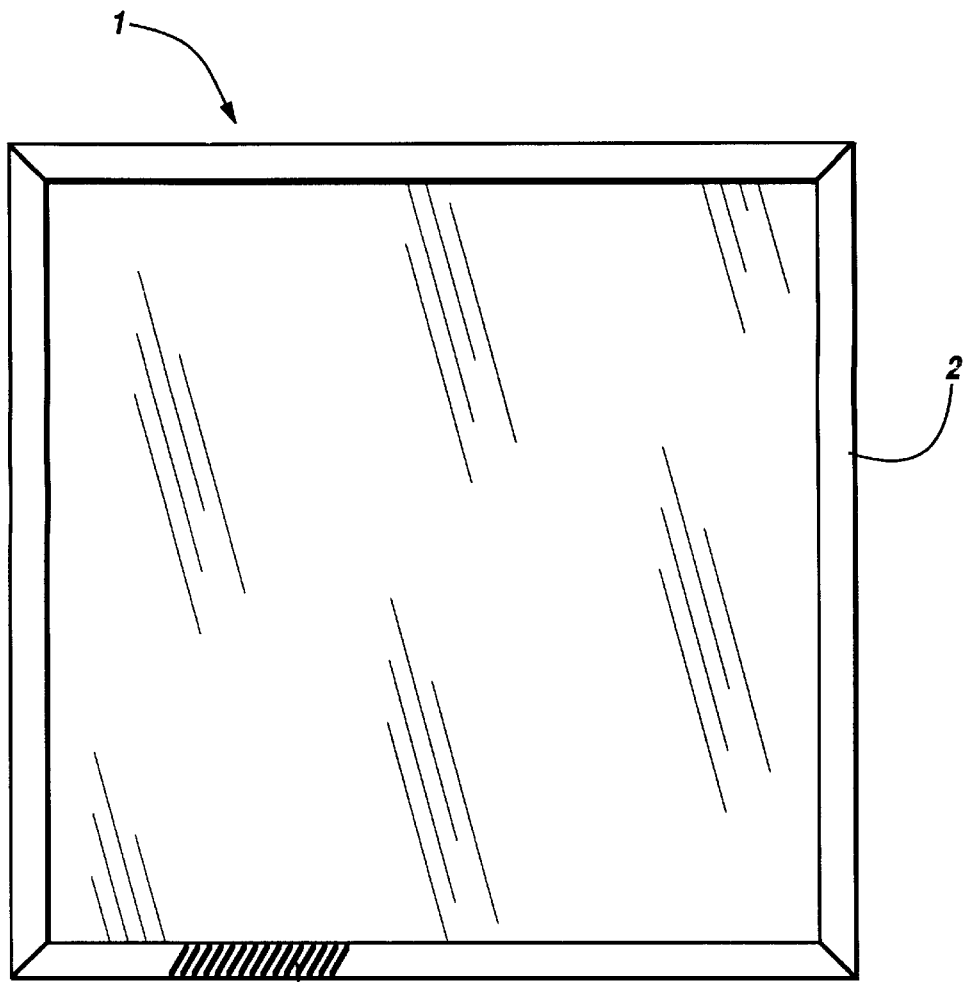
FIG. 1 is an illustration of the back bedding sealant of the present invention applied to a glazing leg so as to hold a pane of glass in the desired position.
Figure 2:
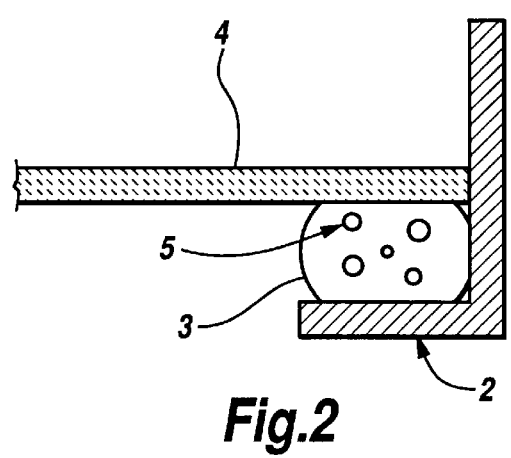
FIG. 2 is a cross-section of the window or door frame of FIG. 1 further illustrating the placement of the sealant.

As illustrated in FIGS. 1 and 2, a door or window frame 1 is constructed with glazing legs 2. A layer of back bedding sealant 3 is applied to the glazing legs of the frame 1. A glass pane 4 is placed on top of the layer of back bedding sealant 3 so that the sealant holds the pane in place, sealing and bonding it to the glazing legs 2. The layer of back bedding sealant 3 firmly adheres to the glass pane 4 and the glazing leg 2 to prevent the glass pane 4 from shifting from its proper position. Ideally, the layer of bedding sealant 3 will hold the glass pane 4 in place even before the sealant has cured, so that the unit will not have to be maintained in a horizontal position. In some applications, glass or clear polystyrene beads or spacers 5 may be added to the sealant to prevent squeeze-out of the sealant when the glass pane is placed into the frame. The diameter of the beads or spacers is typically between about 0.01 inch and 0.1 inch.

The sealants of the invention incorporate a polymer system composed of an acrylic polymer emulsion and a urethane polymer emulsion in combination with additives. The use of the two polymers provides sealants having a unique combination of adhesive properties, glass transition temperatures and tensile properties and was found to be superior to any single polymer system. The use of the urethane polymer emulsion is believed to increase the tensile strength and reduce the loss of tensile strength at elevated temperatures. The urethane polymer emulsion also is believed to provide the desired adhesion to polyvinyl chloride and other plastic materials, while the acrylic polymer emulsion is believed to provide adhesion to other materials such as glass, aluminum, anodized aluminum, wood and treated wood.

The acrylic polymer emulsion has a low glass transition temperature which provides the sealant's low temperature flexibility, the Tg (glass transition temperature) being approximately −34° C. The low temperature flexibility is measured by the AAMA (American Architectural Manufacturer's Association) 800 Specification Test 2.9.1 at 7° F. with a one inch mandrel. The sealant will also pass this test at 0° F.

One acrylic polymer emulsion suitable for use in connection with the present invention is Rhoplex 2620 manufactured by Rohm and Haas Company. The following are typical physical properties of Rhoplex 2620:

solids 62% by weight pH 4.4

Density 8.8 lb./gal.

Viscosity 200 cps @25° F.

Calculated Tg −34° C.

Flexthane 620, a urethane polymer emulsion manufactured by Air Products and Chemicals, Inc., is particularly suitable for use in connection with the present invention due to its compatibility with the Rhoplex 2620. It is an aqueous urethane/acrylic copolymer emulsion formulated for use in the coating and adhesive industries. Typical characteristics of this product include:

Solids 40% by weight

Viscosity 50–125 cps.

pH 7.5–8.5

Density 8.68 lb./gal.

Various additives may be used in the formulation of the sealants of the invention such as glycols, surfactants, bases, mineral oil, antimicrobials, organofunctional silanes and rheological modifiers. The rheological modifier provides wet grab and resistance to squeeze-out when incorporated at proper concentrations. One rheology modifier suitable for use in the practice of the present invention is Alcogum SL-70 manufactured by Alco Chemical Company.

In one embodiment of the present invention the back bedding sealant comprises 50% to 75% by weight of an acrylic polymer emulsion, 7% to 25% by weight of a urethane polymer emulsion which is compatible with the acrylic polymer emulsion, and is formulated with minor amounts of a rheology modifier, a glycol, mineral oil, a silane, a base, a surfactant, tap water, silica and a antimicrobial agent.

One formulation of the present invention produces a clear sealant. Clear sealants generally do not contain extenders or color pigments which would make the sealant opaque. It is possible to incorporate color pigments in order to match the sealant's color to the color of the unit. It is also possible to incorporate extender pigments such as calcium carbonate, clays, silica, and talc at low levels of up to 10% without effecting performance. Higher levels, up to about 60% to 70% may also be possible.

High bond strength is an advantage in the construction of windows because the strength of the unit will not be limited by the sealant. Lighter weight sash and frame components can be used or higher wind pressure can be withstood. The high bond strength of the sealants of the present invention results from a combination of adhesion to the glass and glazing leg material and high tensile properties (modulus and ultimate tensile strength). Tensile properties demonstrate the sealant's resistance to deformation and cohesive failure. This invention achieves ultimate tensile strengths of approximately 100 pounds per square inch after curing at room temperature (less than 85° F.). When adhesion and tensile properties are both high, bond strength will be high.

Adhesion to a surface is measured by a peel test conducted according to the procedure set out in AAMA 800 Test 2.4.1. In this test, both bonding strength and amount of cohesive failure are measured. Cohesive failure is defined by the American Society for Testing and Materials Publication No. C717-93 as "failure characterized by rupture within the sealant, adhesive or coating". High strength and a principally cohesive failure indicate that the sealant has high adhesion to the surface material. Consequently, when the cohesive and tensile strengths are high, the sealant will have high bond strength.

The invention demonstrates high adhesion to a variety of materials used for windows and doors, glass, aluminum, anodized aluminum, polyvinyl chloride, wood and treated wood. When the peel test is conducted on these surfaces, for example, strength values exceed 12.5 pounds per inch with 90% cohesive failure. The tensile properties of the sealants of the invention are also high; for example the modulus at 25% elongation is 50 pounds per square inch (ASTM D412) and ultimate tensile strength (ASTM D412) exceeds 100 pounds per square inch after curing at ambient (less than 85° F.) temperature. The bond strength of the sealants, as measured by lap shear tests, exceeds 100 pounds per square inch when tested between glass and wood after curing for three (3) weeks at room temperature. The test for Lap Shear is detailed below.

Lap shear measures the strength of the sealant bond under conditions of constant shear. The test is conducted as follows:

1. A layer of sealant 0.030 inches in thickness is placed on a 1 inch×3 inch section of material to be tested (wood, glass, polyvinyl chloride, etc.);
2. Another 1 inch×3 inch section of material is placed on top of the sealant so that there is one square inch of overlap;
3. The array is pressed to assure that the sealant is in contact with both sections of material, then weight is applied evenly to the array;
4. The array is cured for the desired testing period at 73°–75° F. and 45%–60% relative humidity; typically, samples are cured for 3 hr., 24 hr., and 3 wk. before testing; and
5. The strength of the bond is then measured using a standard tensile tester pulling at a constant speed.

The invention has low temperature (0° F.) flexibility and high tensile strength at elevated temperature ($\geq 160°$ F.). These properties, combined with the adhesion and bond strength described above, provide a unique sealant with desirable advantages for back bedding uses that require a bonding type sealant.

The rheology of the invention is unique and provides an additional advantage over other water based sealants. The viscosity at ambient temperature and 25 RPM or less is about 500,000 cps. measured on a Brookfield viscometer with a 7 spindle. It provides easy gunnability, pumpability, wet grab and resistance to squeeze-out. Gunnability is determined by the time it takes to gun 175 gm of sealant through a 0.03 in. orifice at a differential pressure of 30 psi. The gunnability for the back bedding sealants of this invention are about 10–20 sec.

Wet grab is the sealant's ability to hold the glass pane in place immediately after installing it in the unit and before any cure takes place. Squeeze-out occurs when the weight of the glass and installation of the stops compress the sealant and displace it from between the glass and glazing legs. If too much squeeze-out occurs, too little sealant will remain to affect a good long-lasting seal. Wet grab and resistance to squeeze-out are functions of the sealant's yield point.

Yield point is a rheological property defined as the force needed to cause flow of the sealant. The sealants of the present invention have a yield point which will resist the force of gravity on the glass pane thus preventing compression and squeeze-out of the sealant after the pane is dropped into place and the unit is still in the horizontal position. This yield point also prevents slippage of the pane when the just-assembled unit is placed in a vertical position. Setting blocks are typically used to prevent the glass pane from slipping when the unit is placed in the vertical position. The rheology of the sealants of the present invention eliminates or minimizes this special care and is, therefore, an advantage.

For some applications "shim" or "spacer" beads may be used to control squeeze-out. These beads, usually glass or plastic, are spherical and range from 0.01 inch to 0.10 inch in diameter. Sealant compression is thus limited by the bead diameter. Although not necessary in all cases, shim or spacer beads may be incorporated into the sealants of the present invention.

The invention will be further described with respect to the following example; however, the scope of the invention is not to be limited thereby.

EXAMPLE 1

A bond type back bedding sealant was formulated from 66% acrylic polymer emulsion and 17% urethane polymer emulsion along with minor amounts of a polyacrylate rheology modifier, glycol, mineral oil, a silane, a base, a surfactant, tap water, silica and a antimicrobial agent. First, the acrylic polymer emulsion is placed in a paddle mixer. The surfactant is diluted with the water, then added to the mixer; followed by the glycol, mineral oil and silane, in that order. The PH is then adjusted to between 6 and 7 with the base. The antimicrobial agent, urethane polymer emulsion, rheology modifier and silica are then added in that order. The mixture is then blended under high shear for at least one hour. All percentages used herein are on a weight basis unless otherwise noted.

The sealant of EXAMPLE 1 was tested for lap shear strength using the test procedure described above, tensile strength and elongation using ASTM Test No. D412 and peel strength using AAMA 800 Test No. 2.4 the test results are recorded in TABLE 1 below:

TABLE 1

Physical Properties & Characteristics

|  | Glass/Aluminum | Glass/Vinyl | Glass/Wood |
|---|---|---|---|
| A LAP SHEAR STRENGTH | | | |
| 3 Hour RT Cure | 0.80 psi | 0.80 psi | 1.00 psi |
| 24 Hour RT Cure | 3.10 psi | 3.10 psi | 64.3 psi |
| 3 Week RT Cure | 41.5 psi | 36.7 psi | 108 psi |
| (RT = Room Temperature) | | | |
| B TENSILE AND ELONGATION | | | |
| Tensile @ 25% elongation | | 47 psi | |
| Tensile @ 50% elongation | | 61 psi | |
| Tensile @ 100% elongation | | 81 psi | |
| Maximum Tensile | | 103 psi | |
| Maximum Elongation | | 392% | |
| C PEEL TEST RESULTS | | | |
| GLASS | | 20.4 pli 75% cf | |
| ANODIZED ALUMINUM | | 19.2 pli 90% cf | |
| VINYL A | | 18.4 pli 100% cf | |
| VINYL B | | 19.8 pli 90% cf | |
| VINYL C | | 23.3 pli 90% cf | |

Table 2 shows a comparison of the tensile strength and elongation characteristics between the sealant of EXAMPLE 1 and water based bedding sealants currently used in the industry. None of the sealants contain pigments.

TABLE 2

Comparative Tensile & Elongation Data

|  | Example 1 | Sealant A | Sealant B | Sealant C |
|---|---|---|---|---|
| Tensile @ 25% elongation | 47 psi | 13.0 psi | 8.0 psi | 16.0 psi |
| Tensile @ 50% elongation | 61 psi | 16.0 psi | 11.0 psi | 23.0 psi |
| Tensile @ 100% elongation | 81 psi | 19.0 psi | 14.0 psi | 34.0 psi |
| Maximum Tensile | 103 psi | 73.0 psi | 83.0 psi | 77.0 psi |
| Maximum Elongation | 392% | 1100% | 1205% | 890% |

While particular embodiments of the present invention have been illustrated and described, it will be apparent to those skilled in the art that various changes and modifications may be made without departing from the spirit and scope of the invention.

We claim:

1. A sealant composition comprising:
   a back bedding sealant formed from a blend of from 50% to 75% by weight of an acrylic polymer emulsion; and from 7% to 25% by weight of a urethane polymer emulsion;

the sealant composition having an ultimate tensile strength of at least 90 psi when cured at a temperature less than 85° F. and wherein said back bedding sealant may be flexibly elongated at least 100% after curing.

2. A sealant composition comprising:

A back bedding sealant formed from a blend of from 50% to 75% by weight of an acrylic polymer emulsion;

from 7% to 25% by weight of a urethane polymer emulsion; and from about 0.1% to about 8.0% of additives to be selected from the group consisting of: rheology modifiers, glycols, mineral oil, silanes, hydroxides and amines, surfactants, water, silicas, and antimicrobial agents.

the sealant composition having an ultimate tensile strength of at least 90 psi when cured at a temperature less than 85° F. and wherein said back bedding sealant may be elongated at least 100% after curing.

3. The sealant composition of claim 2, said sealant composition having a tensile strength of at least 30 psi at 25% elongation.

4. The sealant composition of claim 2, said surfactant comprising an ethoxylated nonylphenol surfactant.

5. The sealant composition of claim 2, said sealant composition having a dry peel strength of at least 12.5 psi when adhered to a substrate selected from the group consisting of glass, aluminum and polyvinyl chloride and cured at a temperature less than 85° F.

6. The sealant composition of claim 2, said sealant composition having a maximum elongation of less than 500%.

7. A sealant composition comprising:

a back bedding sealant formed from a blend of from 50% to 75% by weight of an acrylic polymer emulsion;

from 7% to 25% by weight of a urethane polymer emulsion, said urethane polymer emulsion being compatible with said acrylic polymer emulsion;

from about 0.1% to about 8.0% additives to be selected from the group consisting of: rheology modifiers, glycols, mineral oil, silanes, hydroxides and amines, surfactants, water, silicas, and antimicrobial agents;

said back bedding sealant having a tensile strength of at least 30 psi at 25% elongation and an ultimate tensile strength of at least 90 psi when cured at a temperature less than 85° F. and wherein the back bedding sealant may be elongated at least 100% after curing.

8. The sealant composition of claim 7, said surfactant comprising an ethoxylated nonylphenol surfactant.

9. The sealant composition of claim 8, said sealant composition having a dry peel strength of at least 12.5 psi when adhered to a substrate selected from the group consisting of glass, aluminum and polyvinyl chloride.

10. The sealant composition of claim 8, said sealant composition having a maximum elongation of less than 500%.

11. A sealant composition comprising:

a back bedding sealant formed from a blend of from 50% to 75% by weight of an acrylic polymer emulsion;

from 7% to 25% by weight of a urethane polymer emulsion, said urethane polymer emulsion being compatible with said acrylic polymer emulsion; and from about 0.1% to about 8% additives to be selected from the group consisting of: rheology modifiers, glycols, mineral oil, silanes, hydroxides and amines, surfactants, water, silicas, and antimicrobial agents; and said composition having a tensile strength of at least 30 psi at 25% elongation, an ultimate tensile strength of at least 90 psi at a temperature less than 85° F. and lap shear strength of at least 100 psi between glass and wood substrates after three weeks curing time at ambient (less than 85° F.) temperature and wherein said back bedding sealant may be elongated at least 100% after curing.

12. The sealant composition of claim 11, said sealant composition having a dry peel strength of at least 12.5 psi when adhered to a substrate selected from the group consisting of glass, aluminum and polyvinyl chloride.

13. The sealant composition of claim 11, said sealant composition having a maximum elongation of less than 500%.

* * * * *